March 13, 1956  R. G. ELMENDORF  2,737,681
SOOT BLOWER

Filed June 23, 1953  6 Sheets-Sheet 1

INVENTOR
RICHARD G. ELMENDORF
BY
ATTORNEYS

March 13, 1956  R. G. ELMENDORF  2,737,681
SOOT BLOWER

Filed June 23, 1953  6 Sheets-Sheet 2

Fig. 3.

INVENTOR
RICHARD G. ELMENDORF
BY
ATTORNEYS

March 13, 1956  R. G. ELMENDORF  2,737,681
SOOT BLOWER

Filed June 23, 1953  6 Sheets-Sheet 3

INVENTOR
RICHARD G. ELMENDORF
BY
ATTORNEYS

March 13, 1956 R. G. ELMENDORF 2,737,681
SOOT BLOWER
Filed June 23, 1953 6 Sheets-Sheet 4

INVENTOR
RICHARD G. ELMENDORF
BY
ATTORNEYS

March 13, 1956 R. G. ELMENDORF 2,737,681
SOOT BLOWER
Filed June 23, 1953 6 Sheets-Sheet 6

INVENTOR
RICHARD G. ELMENDORF
BY
ATTORNEYS

United States Patent Office 2,737,681
Patented Mar. 13, 1956

2,737,681
SOOT BLOWER

Richard G. Elmendorf, Upper Darby, Pa.

Application June 23, 1953, Serial No. 363,625

8 Claims. (Cl. 15—318)

The present invention relates to soot blowers of the type in which the medium, such as air or steam, is impelled against furnace surfaces which are likely to retain soot or slag.

In the prior art, it has been desirable to provide soot blowers with means for advancing and retracting the blower tube, so that in inactive position the blower tube will not be subjected to furnace temperature, but when the device is to become operative, the blower tube can advance to the desirable position inside the furnace, and then turn in order to direct the blowing medium in different angular positions. Automatic mechanism has been devised as shown in Howse U. S. Patent 2,442,045, granted May 25, 1948, for automatically opening the valve to admit the blowing medium to the blower tube when the blower tube achieves its forward position. This device, however, is subject to the limitation that the valve can remain open only approximately over 320 degrees of arc of the angular movement of the blower tube, so that an area remains in the furnace which cannot be reached by the soot blower, corresponding to approximately 40 degrees of arc of movement of the blower tube during which the valve remains closed.

The present invention is designed to retain the advantages of advance of the blower tube and automatic turning on of blowing medium, but to permit the blower tube to operate effectively throughout the entire 360 degrees of the arc. Furthermore, this advantage is accomplished in a manner which is simple, reliable, and convenient in operation.

The device is readily adapted to conversion of existing soot blowers, simply by modifying the follower and attaching the latch and its biasing means. The modification can be made very inexpensively, and without taking the mechanism out of service for any extended period.

A purpose of the invention is to permit a rotatable coverage of a 360 degree angle by the blower tube while the valve controlling the blowing medium remains open.

A further purpose is to permit the valve operating follower to be latched open on one direction of blower tube movement and prevent closure of the valve while the follower rides over an opening in the cam rim which would normally cause valve closure.

A further purpose is to engage a movable latch by the advancing edge of the cam track at a point at which the valve is open, to move the latch engaging the outside of the cam track to a position at which the valve would close but for the latch, and in that position to interpose the latch between the cam track and the valve operating follower to hold the valve open.

A further purpose is optionally to pivot the latch on the valve operating follower or to pivot on a fixed pivot, or to translate the latch along a path which intersects the desired position of latch operation.

A further purpose is to contact a latch mounted on the valve operating follower by the advancing edge of the cam track at a point at which the valve is open and the latch is biased to move into the opening in the cam track, to swing the latch away from the active end of the follower and into a position in which the latch contacts the cam track to hold the valve open by the contact of the latch with the cam rim at a position at which the follower no longer contacts the cam rim, to return the active end of the latch to a position adjacent the active end of the follower when the trailing edge of the cam track moves beyond the latch, and to bring the follower into the opening of the cam track on reversal of the cam track and desirably as the follower moves into valve-closing position to bias the latch to reach a position behind the active face of the cam follower.

A further purpose is to shift the bias of the latch depending on the position of the valve follower, biasing the latch to extend inwardly beyond the follower when the follower is in valve-opening position and to remain outward behind the active face of the follower when the follower is in valve-closing position.

A further purpose is to pivot the latch on the side of the cam at which the opening in the cam is located when the valve would close and by manipulation of the latch engaging the forward end of the cam and engaging the outside of the cam to hold the valve follower open by interposing the latch in one position between the cam track and the valve follower.

A further purpose is to bias a plunger latch to a position in the opening of the cam at which it will be engaged by the forward edge of the cam track, and by the pressure of the forward edge to move the latch to a position in which it engages the outside of the cam and also the valve follower and prevents the valve follower from closing the valve.

In the drawings I have chosen to illustrate a few only of the numerous embodiments in which my invention may appear, selecting the forms shown from a standpoint of convenience in illustration, satisfactory operation and clear demonstration of the principles involved.

Figures 13 and 14 illustrate a further variation in which the latch has a plunger or sliding mounting traveling along a linear path.

In the drawings like numerals refer to like parts throughout.

The invention may be embodied in various forms, in which a latch is engaged by the advancing end of the cam track and moved to a position in which it intrudes between the outside of the cam track and the valve follower to hold the valve open when it would otherwise be closed by entry of the valve follower into the cam track. Figures 1 to 12 inclusive show an embodiment in which the latch is pivoted on the valve follower, while Figures 5a and 6a illustrate a latch swinging on a fixed pivot and Figures 13 and 14 employ a translating latch as later described.

Figure 3:
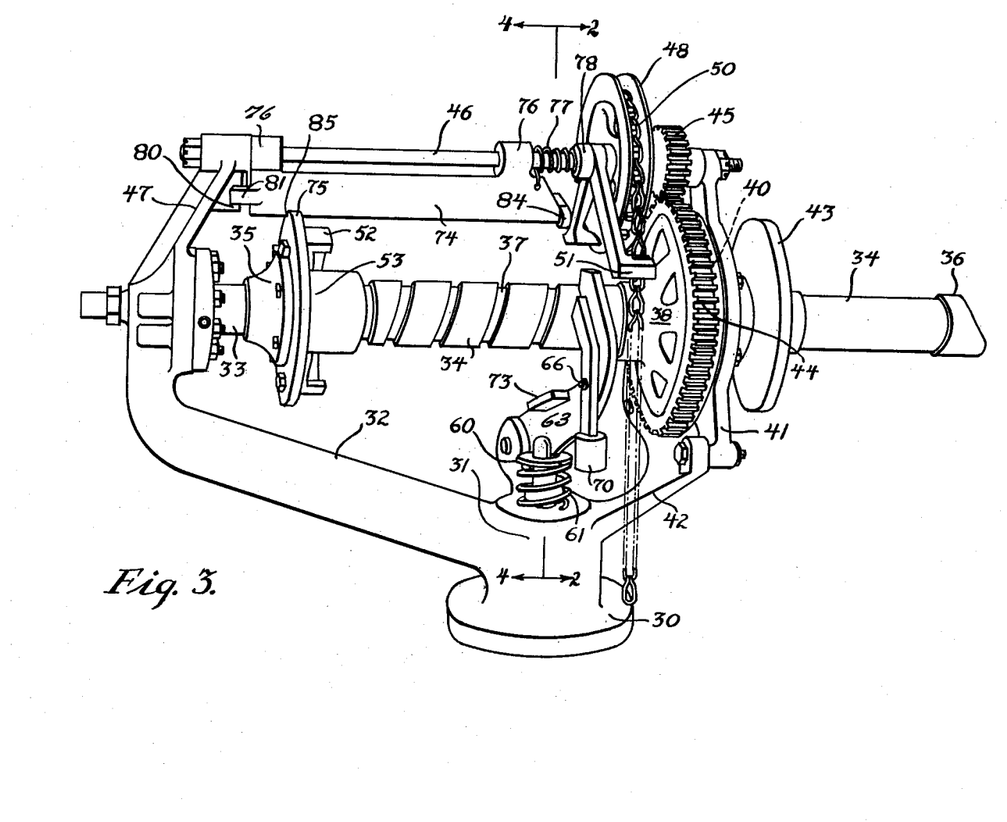
Figure 3 is a perspective of a soot blower of the character which will be employed in the invention, with the blower tube retracted.
Figure 3A:
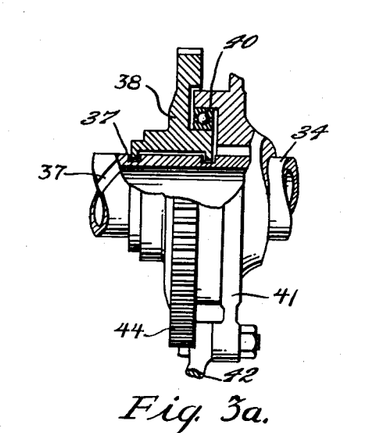
Figure 3a is a fragmentary elevation of the gear-nut, partly in axial section.
Figure 4:
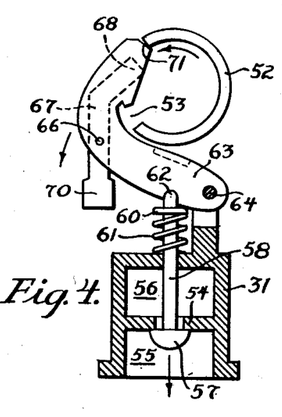
Figures 4 to 10 inclusive are diagrammatic sections showing the cam track, follower, latch and valve in different positions, and corresponding generally to sections on the line 4—4 of Figure 3.

Referring to Figure 3 which shows a soot blower of the type well known in the art and illustrated more in detail in the Howse patent above referred to, a considerably hollow base 30 provides a connection at the bottom for the blowing medium, which is introduced through a valve 31 to a conduit 32 which extends to the rear of the soot blower and connects with an inner telescoping supply tube 33 which is surrounded by a blower tube 34, the joint at the rear of the blower tube 34 being sealed in sildable relation to the supply tube 31 by a packing gland 35. The blower tube has at the forward end a suitable nozzle 36. At a point intermediate its ends the blower tube has external threads 37 which make threaded engagement with the internal threads on drive nut 38, the drive nut being mounted on a suitable bearing 40 in a frame 41 which is secured by bracket 42 to the base 30. The frame 41 is provided with a mounting flange 43 which permits the attachment of the blower to the supporting structure of the furnace.

The drive nut 38 is driven in a suitable manner, mechanically or by hand, the form shown being one optional type of drive. A gear 44 is formed integral with the drive nut, and this is intergeared with pinion 45 which turns freely on fixed shaft 46 mounted between the frame 41 and a bracket 47 extending upwardly from the conduit 32. The pinion is rigidly connected with a driving sheave wheel 48 which also turns freely on the shaft 46, and is turned by chain 50 which is guided by chain guide 51.

Near its rearward end the blower tube carries a cam rim 52 which is suitably of uniform radius and extends circumferentially around the axis of the blower tube over a major portion of the circumference, being interrupted to form an opening 53 over a minor portion of the circumference. The valve desirably comprises a seat 54 which is located in a wall between an inlet chamber 55 and an outlet chamber 56 to the conduit 32. A valve element 57 is adapted to close against the seat, and is supported and operated by a plunger 58 which extends through the valve casing, and carries near its outer end a spring abutment 60. A suitable spiral compression spring 61 interposed between the valve casing and the retainer 60 urges the valve toward closed position. The outer end of the stem is suitably notched at 62 to engage and respond to the motion of a follower 63 which is mounted on a fixed pivot 64 near one end of the follower. The pivot is desirably mounted on the housing of the valve. The follower is desirably of L shape as shown.

The follower has an active face 65 which, when the blower tube is forward, is adapted during a portion of the circumference to engage the outside of cam rim 52, and during another portion of the circumference under certain conditions as later explained moves into the cam opening 53. When the follower is out engaging the outside of cam rim 52 the valve is open, and when it moves in as shown in Figures 1, 2, 4 and 10, the valve is closed.

At a position intermediate between the ends of the follower, a pivot 66 is mounted on the follower, and in this form of the invention a latch 67 is pivoted thereon. The latch has in this form a latching end 68, which is generally of hook shape, on one side of the pivot adjoining the active face 65 of the follower and at the other end a counterweight 70 which is desirably located substantially directly below the pivot in the valve closing position of the follower, but heavy enough to over-balance the latching end 68.

The latch is relatively shorter than the follower, so that the inclined end 71 of the follower which is engaged by the initially forwardly moving edge 72 of the cam track in open position will be deflected outwardly to open the valve as later described. The latch being shorter does not extend endwise as far as the opening inclined surface 71 of the follower.

A stop 73 is provided on the follower which limits the movement of the latch when it is holding the valve open.

A rail 74 extends longitudinally above a flange 75 located on the blower tube immediately behind the cam portion 52. The rail is pivoted by bearings 76 on shaft 46, and is urged toward rearward position and also toward clockwise position as viewed from the rear by spiral compression-torsion spring 77 which is anchored on ring lock collar 78 secured by a set screw to fixed shaft 46 at one end, and on the front of the rail at the other end. Fixed to bracket 47 and located immediately behind the rail as best seen in Figures 3 and 11 is a locking projection 80 engageable on one side by rail lug 81 when the rail is in rearward position, and on the other side by a locking lug 82 which has a step recess 83, which holds the rail against turning about the shaft 46 when it is rearwardly positioned, but permits the rail to rock through the space provided by the step recess 83 when the rail moves forward by compression of spring 77.

At the forward end of the rail there is an abutment 84, which is engaged by the flange 75 when the blower tube moves forward to move the rail forward. The flange 75 is notched at 85 and the lower portion of the rail extends into the notch when the rail is in its central position, as shown by the solid lines in Figure 12, but moves out of the notch when the rail is angularly deflected as shown by dot-and-dash lines in Figure 12.

In operation, starting with the blower tube in retracted position as shown in Figure 3, in order to bring the device into blowing position the chain 50 is pulled to turn the sheave wheel 48 counterclockwise, thus turning driving nut 38 clockwise and moving the blower tube forward since it is restrained from turning by the engagement of rail 74 in notch 85 of flange 75. The rail in this position is restrained against turning by the engagement of locking lug 82 against locking projection 80 in the position shown in solid lines in Figure 11. The further counterclockwise turning of the sheave wheel 48 merely advances the blower tube forwardly until flange 75 at the rear of the blower tube engages forward rail projection 84, causing the rail to move forward by compression of spring 77, and thus advancing the rail until the rail moves forward a distance corresponding to the length of the step recess 83 (Figure 11).

Figure 11:
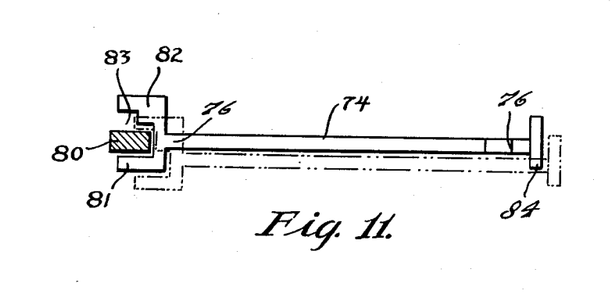
Figure 11 is a diagrammatic plan view showing the rail lock.
Figure 12:
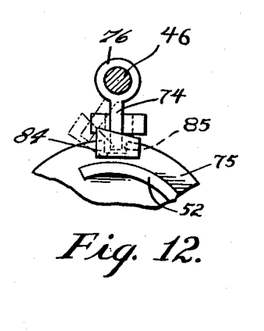
Figure 12 is a fragmentary section of Figure 3 on the lien 4—4, showing the engagement of the rail detent in its retaining position and with the position for blower tube rotation shown in dot-and-dash lines.

Further clockwise movement of the driving nut 38 tending to urge the blower tube clockwise results in swinging of rail 74 from the solid line position of Figures 11 and 12 to the dot-and-dash line position of Figures 11 and 12 (toward the observer in Figure 3), in which position the rail is withdrawn from the notch 85 of flange 75, and the blower tube is free to turn.

On further rotation of the sheave wheel counterclockwise in a direction to move the blower tube clockwise as viewed from the rear in Figure 3, the blower tube turns with the driving nut 38 as later explained.

As the blower tube reaches its forward position, the cam rim 52 moves into line with follower 63 and latch 67, the original entry being made by the follower and latch fitting in cam opening 53 which is initially in line with the active ends of the follower and latch as shown in Figure 3. On further clockwise rotation of the blower tube, as viewed from the rear in Figure 3 (counterclockwise in Figure 4) the leading edge 72 of cam rim 52 advances into engagement with the forward nose portion 71 of the follower as seen in Figure 4. In this position the valve is still closed and the counterweight 70 biases the latch so that the active end 68 of the latch does not extend radially inwardly beyond the active face 65 of the follower, since the overbalancing effect of the counterweight holds the latch in this position. On further travel of the blower tube in the same direction as shown in Figure 5, the leading edge 72 of the cam rim deflects the follower outwardly, opening the valve 31, and causing the active face 65 of the follower to engage the outside of the cam rim 52 for the first time in this cycle of operation.

Figure 5:
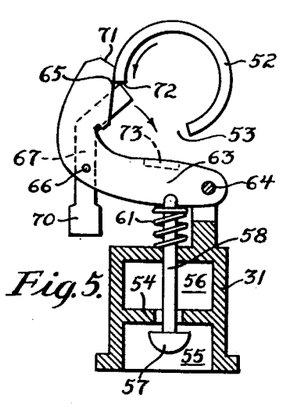
Figure 5A:
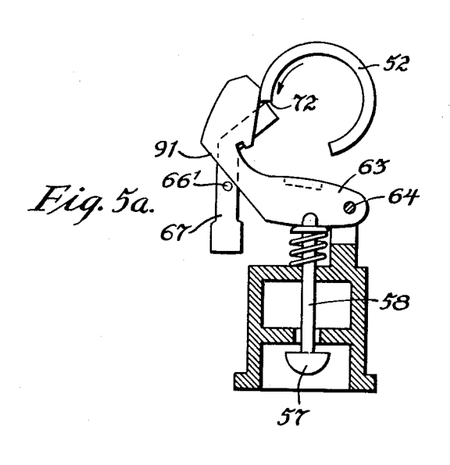
Figures 5a and 6a are views corresponding to Figures 5 and 6 showing a modification in which the latch is pivoted on a fixed pivot independently of the valve follower.

The follower has now shifted its position to the left in Figure 5 and the counterweight readjusts the position of the latch so that its active end swings inwardly slightly with respect to the active face of follower 65, so that the leading edge 72 engages the active end of the latch as shown in Figure 5.

It will be evident that the follower has two limiting positions, one for valve closing and the other for valve opening. The latch line of bias force is such that it holds the latch retracted behind the active face of the follower when the follower is in valve closing position and biases the latch to a position extended beyond the active face of the follower when the follower is in valve opening position. In other words, the latch pivot swings with the follower around a small angle as the valve opens, the follower swings through the same angle, but the offsetting of the line of latch bias to one side as the follower pivot moves causes the latch to move radially inward with respect to the follower as the follower swings radially outward. Thus where the follower is of L shape and the latch has a nose inwardly directed with respect to the L, the line of bias is desirably substantially tangent to the cam circle, parallel to the valve axis when the latch and follower are in the radially inner position.

Figure 6:
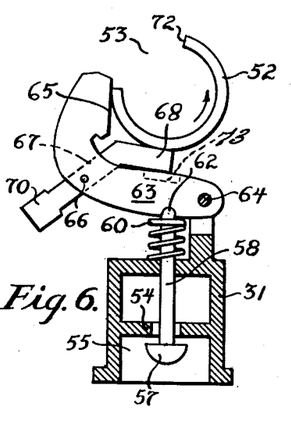
Figure 6A:
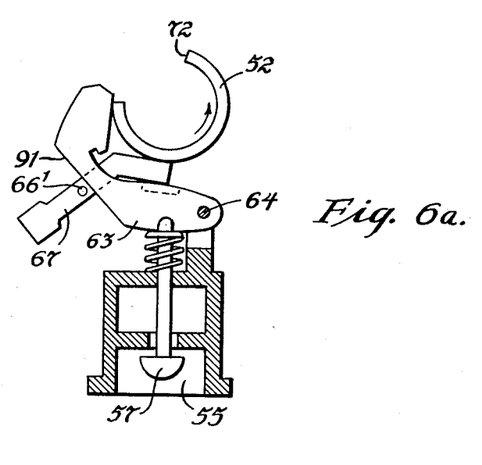

On further movement of the blower tube in the same direction, the latch is angularly shifted away from the active face of the follower, until it reaches a limiting position of engagement with stop 73, in which position, as shown in Figure 6, the active end of the latch contacts the outside of the cam rim 52 and is capable of holding the valve open, but this is not yet necessary as the active face 65 of the follower still engages the outside of the cam rim (Figure 6).

Figure 7:
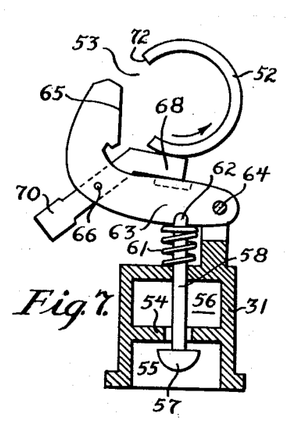

On still further motion of the blower tube in the same direction, as shown in Figure 7, the active end 68 of the latch 67 contacts the outside of cam rim 52 and holds the valve open notwithstanding that the active face 65 of the follower 63 is now opposite the opening 53 in the cam rim. At this point, were it not for the presence of latch 67, the valve would close and the device would become inoperative to perform its cleaning function over a substantial arc of blower tube rotation as in the prior art.

Figure 8:
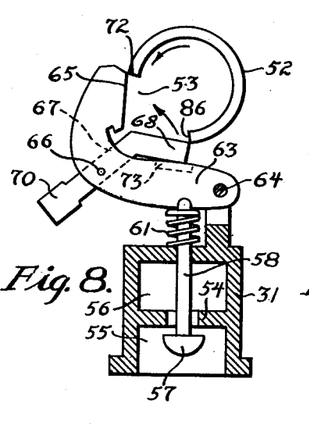

On still further movement of the blower tube in the same direction as shown in Figure 8, the trailing edge 86 of cam rim 52 leaves the active end 68 of the latch, and the valve would be free to close were it not for the fact that the active face 65 of follower 63 has now engaged the leading edge 72 of cam rim 52, and the valve is still held open. Thus as long as the blower tube is turned continuously in this same direction, it can move around any desired number of revolutions as determined by the manual manipulation or by the manual or automatic control of the mechanical drive, and the valve will remain open indefinitely as long as the motion does not reverse direction.

After the position of Figure 8 the latch is no longer held in engagement with the outside of cam rim 52, and the biasing due to the counterweight restores it to the position of Figure 5, in which it is biased to hold the active end of the latch inwardly of the active face 65 of the follower.

Figure 9:
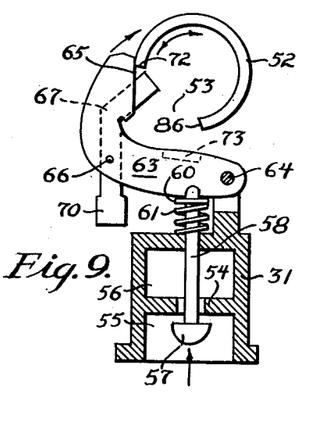
Figure 10:
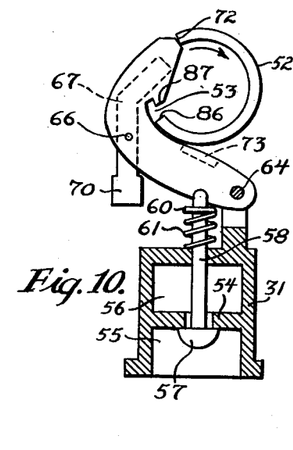

If now a reversal in direction of movement of the blower tube takes place as shown by the double arrows of Figure 9, the former trailing edge 86 becomes the leading edge and the former leading edge 72 becomes the trailing edge, the new trailing edge 72 moves backward from the active face 65 of the follower, and the follower urged by spring 61 moves into cam opening 53 as shown in Figure 10, closing the valve. The driving nut 38 is now moving in a direction which is counterclockwise when viewed from the rear in Figure 3, and the notch 85 on flange 75 now reengages rail 74 and locks to the position shown in full lines in Figure 12, in which case the rail restrains further counterclockwise movement of the blower tube by engagement of lug 81 with locking projection 80, and further counterclockwise movement of driving nut 38 causes the blower tube to retract to its rearward position as shown in Figure 3. This suitably happens before the edge 86 of the cam track engages the end 87 of the follower (Figure 10).

As soon as the flange 75 ceases to engage abutment 84 on the rail, spring 77 retracts the rail 74 to its rearward position, where the rail remains, restraining flange 75 against turning, as the blower tube completes its retraction to the limit of its rearward motion.

Figure 1:
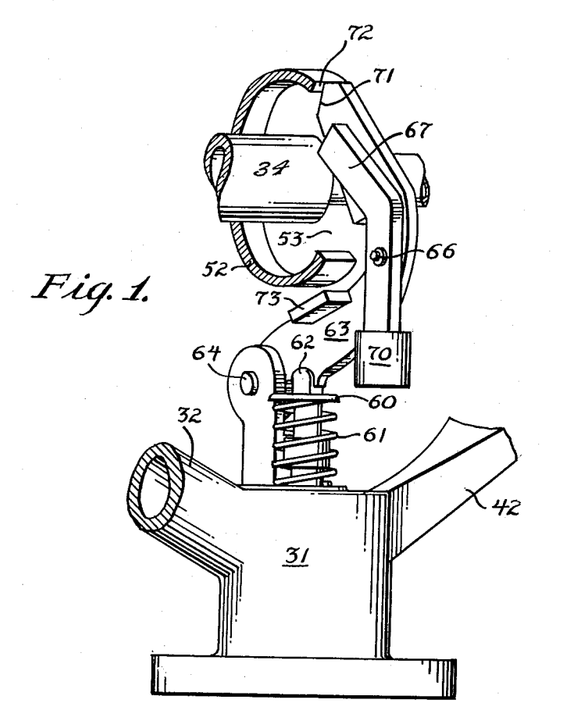
Figure 1 is a fragmentary perspective showing the valve, follower, latch and cam rim of the invention, the position shown being that in which the valve is closed.
Figure 2:
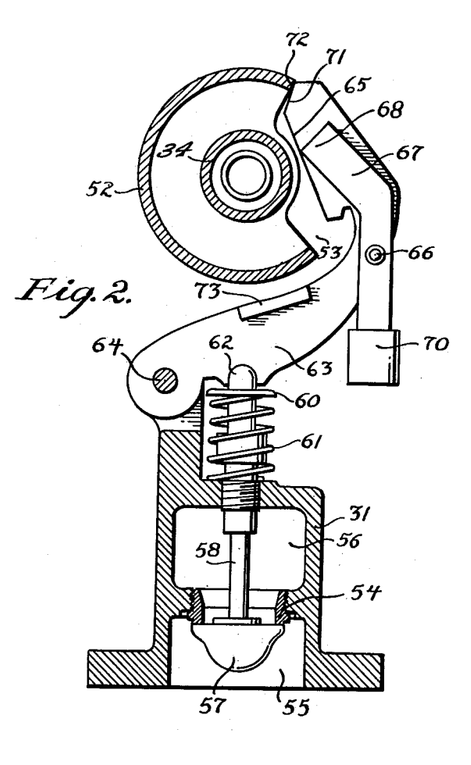
Figure 2 is an enlarged section on the line 2—2 of Figure 3, but differing from Figure 3 in that the blower tube and cam rim are advanced rather than being retracted as in Figure 3, the section illustrating the valve in closed position, the follower, the latch and the cam rim.

In many cases it is desirable to mount the blower in a position in which the latch would not remain nearly vertical in the position corresponding to Figure 2 as shown. In this case in order to obtain the change in biasing of the latch which has been referred to, it will either be necessary to extend the counterweight arm at an angle which, when the forces are resolved, will give the desired shift in biasing, or to employ biasing means other than gravity.

Figure 2A:
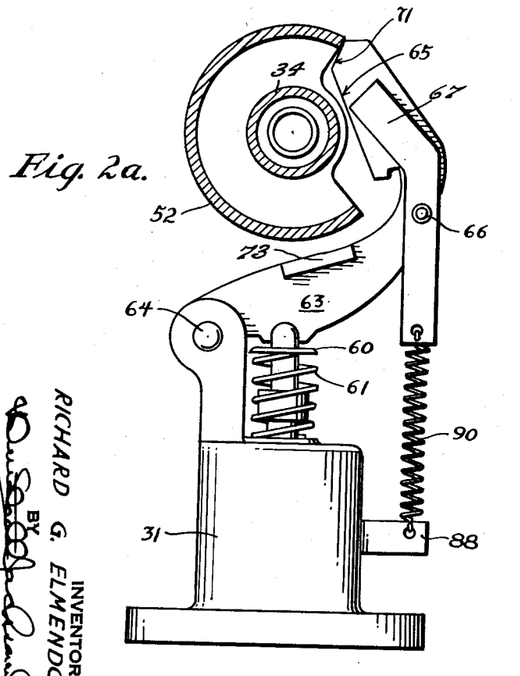
Figure 2a is a view corresponding to Figure 2 and showing a variation.

Figure 2a illustrates a modification which is clearly adaptable in any angular position of the blower, in which the counterweight 70 is eliminated, a spring abutment 88 is provided suitably on the valve housing and desirably in line with the major longitudinal axis of the latch in the position of Figure 2a, and a spiral tension spring 90 is suitably engaged between openings on the abutment and on the latch as shown.

While in the embodiment previously described, the latch is pivoted on the valve follower, this is not necessarily the case, as the latch may be oscillable on a pivot fixed to the frame, as shown in Figures 5a and 6a. In this construction the soot blower including the cam rim 52 will suitably be the same as that in the form previously described and the valve follower 63 is desirably identical except for clearance at 91 against possible interference with the fixed pivot. The latch 67 in this form is pivoted on a fixed pivot 66' mounted on the frame, and the operation of the latch, valve follower, cam track and related parts will desirably be identical with that already described.

Figure 13:
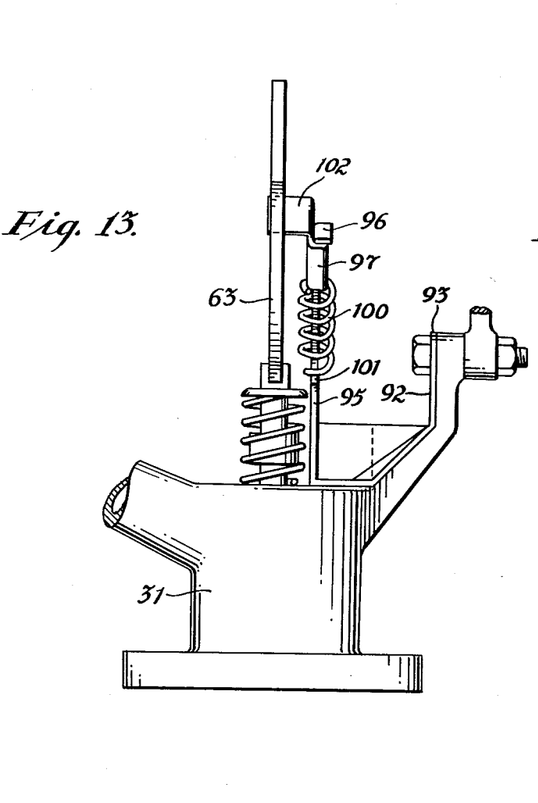
Figure 13 is a fragmentary side elevation showing the modified form generally from the position illustrated in Figures 1 and 3.
Figure 14:
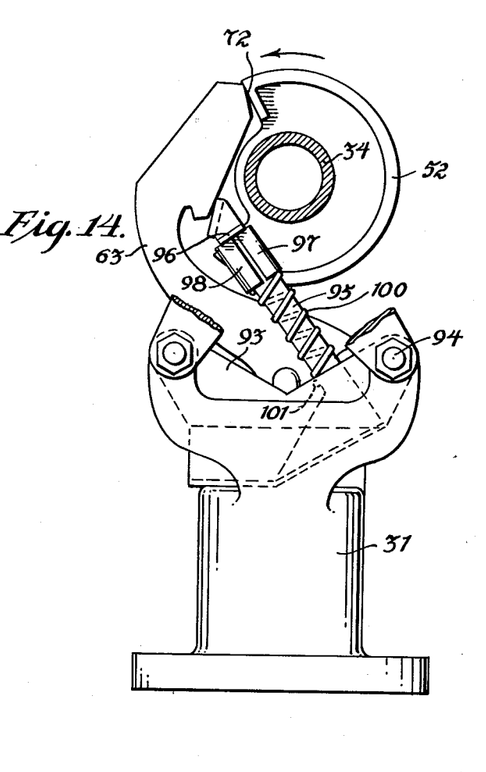
Figure 14 is a view corresponding to Figure 4, partially sectioned away, showing the initial engagement of the advancing end of the cam track with the valve follower, the latch being in the opening of the cam track about to be engaged by the forward end of the cam track and pushed outwardly.

In some cases it is preferable to provide a latch which moves along a linear path rather than a swinging latch. This is shown in Figures 13 and 14, in which the cam track 52 and the valve follower 63 may be identical with that previously described except for the omission of the pivot 66 on the valve follower.

A latch bracket 92 having a bifurcated base 93 is secured to the frame as through the bracket mounting bolts 94. The bracket carries a reverse bend portion having a diagonally upwardly extending latch guide 95 carrying a stop 96 at the upper end.

A slidable latch 97 surrounds the guide, having opposed guiding ears 98 which substantially envelope the guide while permitting translation of the latch. The latch is resiliently urged against stop 96 by spiral compression spring 100 which surrounds the guide and acts between a spring abutment 101 on the guide and the latch.

The latch at its outer end has a transversely extending latch dog 102 and at its extremity in one position extends into the opening of the cam track, and in another position is adapted to engage the cam track and the valve follower.

The operation of the device of Figures 13 and 14 is substantially the same as that of the other forms except that in a position corresponding to Figure 5 the latch dog 102 is engaged by the forward end of the cam track and forced generally downward and out of the cam opening until it rides against the outside of the cam track and remains riding the outside of the cam track in the positions corresponding to Figures 6 and 7. In these positions the latch dog engages the valve follower and in the position of Figure 7 holds the valve open when it would otherwise close. At a position corresponding to that of Figure 8 the latch is released by the trailing end of the cam track and snaps into the cam opening, returning to the position shown in Figure 14.

In case, however, of reverse motion of the cam track as indicated in Figures 9 and 10 the latch does not move to the position interposed betwen the outside of the cam track and the valve follower and instead permits the valve to close. In Figure 14 there is never interference between the reverse moving end of the cam track and the latch dog because during motion in that direction the cam track is limited by notch 85 before it encounters the latch in the limiting position of the latch.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a soot blower, a blower tube adapted to move forward in the blowing position and to turn in its forward position, a cam moving with the blower tube having a circumferential outer rim over a major portion of its circumference adapted to open a valve mentioned below and an opening in the rim over a minor portion of its circumference adapted to permit the valve to close, a blowing medium conduit connected with the blower tube, a valve in the blowing medium conduit, a valve operating follower riding the cam rim when the valve is open and adapted to extend into the opening to permit the valve to close, and latch means having a range of movement which in one position locates the latch means in the cam opening in position to be engaged by the forward end of the cam and in another position interposes the latch means between the outside of the cam and the valve follower to hold the valve open when it would otherwise close, the latch means being shifted from the position in the cam opening to the position holding the valve open by engagement with the forward end of the cam.

2. In a soot blower, a blower tube adapted to move forward in the blowing position and to turn in its forward position, a cam moving with the blower tube having a circumferential outer rim over a major portion of its circumference adapted to open a valve mentioned below and an opening in the rim over a minor portion of its circumference adapted to permit the valve to close, a blowing medium conduit connected with the blower tube, a valve in the blowing medium conduit, a valve operating follower riding the cam rim when the valve is open and adapted to extend into the opening to permit the valve to close, and a pivoted latch which in one position extends into the cam opening, which at another position is interposed between the outside of the rim of the cam and the valve follower to hold the valve open when it would otherwise close and which is moved from one position to the other position by the forward end of the cam.

3. In a soot blower, a blower tube adapted to move forward into blowing position and to turn in its forward position, a cam moving with the blower tube having a circumferential outer rim over a major portion of its circumference adapted to open a valve mentioned below and an opening in the rim over a minor portion of its circumference adapted to permit the valve to close, a blowing medium conduit connecting with the blower tube, a valve in the blowing medium conduit, a valve operating follower riding the cam rim when the valve is open and adapted to extend into the opening to permit the valve to close, and a latch mounted on the follower and in one position engaging between the cam rim and the follower and preventing the follower from entering the opening in the cam to close the valve.

4. In a soot blower, a blower tube adapted to move forward into blowing position and to turn in its forward position, a cam moving with the blower tube having a circumferential outer rim over a major portion of its circumference adapted to open a valve mentioned below and an opening in the rim over a minor portion of its circumference adapted to permit the valve to close, a blowing medium conduit connecting with the blower tube, a valve in the blowing medium conduit, a valve operating follower riding the cam rim when the valve is open and adapted to extend into the opening to permit the valve to close and a latch pivotally mounted on the follower and biased to move relative to the follower into the opening at a position at which the follower is being moved to open the valve, one end of the latch in a position at which the latch enters the opening engaging an end of the rim and on further advance of the end of the rim substantially changing its position with respect to the follower, taking up a position against the cam rim and holding the follower in a valve-opening position notwithstanding that the follower is opposite the opening in the rim.

5. In a soot blower, a blower tube adapted to move forward and to turn in its forward position, a cam moving with the blower tube having a circumferential outer rim extending over a major portion of the circumference adapted to open a valve mentioned below and having an opening in the rim over a minor portion of the circumference adapted to permit the valve to close, a blowing medium conduit connecting with the blower tube, a valve in the blower medium conduit, a valve operating follower pivoted at one end and engaging the valve to open it at a position intermediate the ends of the follower, the end of the follower opposite from the pivot engaging the cam rim substantially tangentially when the valve is in open position, and adapted to extend into the opening in the rim to permit the valve to close, a latch pivotally mounted intermediate the ends of the latch on the follower intermediate the ends of the follower, the latch being shorter than the follower and the end of the latch adjoining the end of the follower remote from the pivot being biased to move relatively to the follower toward the opening in the cam rim and into the opening when it is opposite the latch, the latch engaging the advancing end of the cam rim after movement of the follower to open the valve and, under further advance of the forward edge of the cam rim, being carried by that edge through an angular movement with respect to the follower which separates the active end of the follower from the active end of the latch and places the active end of the latch in contact with the cam track at a position on the cam track forward with respect to the movement of the cam track and with respect to the engagement position of the follower with the cam track, the latch remaining in contact with the cam track and holding the valve open after the follower reaches a position opposite the opening in the cam track, and when the trailing edge of the cam track passes beyond the latch the latch retracting to a position behind the follower with respect to the cam track, the leading edge of the cam track at that point having reengaged the follower, and bias means biasing the latch so that its active end extends inwardly of the cam face with the follower in valve opening position and biasing the latch to remain retracted behind the active face of the follower when the follower is in valve closing position.

6. In a soot blower, a blower tube adapted to move forward and to turn in its forwrad position, a cam moving with the blower tube having a circumferential outer rim extending over a major portion of the circumference adapted to open a valve mentioned below and having an opening in the rim over a minor portion of the circumference adapted to permit the valve to close, a blowing medium conduit connecting with the blower tube, a valve in the blower medium conduit, a valve operating follower pivoted at one end and engaging the valve to open it at a position intermediate the ends of the follower, the end of the follower opposite from the pivot engaging the cam rim substantially tangentially when the valve is in open position, and adapted to extend into the opening in the rim to permit the valve to close, a latch pivotally mounted intermediate the ends of the latch on the follower intermediate the ends of the follower, the latch being shorter than the follower and the end of the latch adojining the end of the follower remote from the pivot being biased to move relatively to the follower toward the opening in the rim and into the opening when it is opposite the latch, the latch engaging the advancing end of the cam rim after movement of the follower to open the valve and, under further advance of the forward edge of the cam rim, being carried by that edge through an angular movement with respect to the follower which separates the active end of the follower from the active end of the latch and places the active end of the latch in contact with the cam track at a position on the cam track forward with respect to the movement of the cam track and with respect to the engagement position of the follower with the cam track, the latch remaining in contact with the cam track and holding the valve open after the follower reaches a position opposite the opening in the cam track, and when the trailing edge of the cam track passes beyond the latch the latch retracting to a position behind the follower with respect to the cam track, the leading edge of the cam track at that point having reengaged the follower, and bias means biasing the latch so that its active end extends inwardly of the cam face with the follower in valve opening position and biasing the latch to remain retracted behind the active face of the follower when the follower is in valve closing position, on reversal of the cam track rotation the follower moving into the opening of the cam track as soon as the trailing edge on the cam track passes beyond the follower and closing the valve.

7. In a soot blower, a blower tube adapted to move forward in the blowing position and to turn in its forward position, a cam moving with the blower tube having a circumferential outer rim over a major portion of its circumference adapted to open a valve mentioned below and an opening in the rim over a minor portion of its circumference adapted to permit the valve to close, a blowing medium conduit connected with the blower tube, a valve in the blowing medium conduit, a valve operating follower riding the cam rim when the valve is open and adapted to extend into the opening to permit the valve to close, a latch guide extending to positions adjacent the cam opening and adjacent the outside of the cam, a latch slidable on the latch guide and having one position in the cam opening at which it is engageable by the advancing end of the cam and another position interposed between the outside of the cam and the valve follower to hold the valve open, the latch being movable from one position to the other position under the action of the advancing end of the cam and means for biasing the latch to its position in the opening of the cam.

8. In a soot blower, a blower tube adapted to move forward into blowing position and to turn in its forward position, a rotating cam moving with the blower tube having a circumferential outer rim over a major portion of its circumference adapted to open a valve mentioned below and an opening in the rim over a minor portion of its circumference adapted to permit the valve to close, a blowing medium conduit connecting with the blower tube, a valve in the blowing medium conduit, a valve operating lever therefor, and means on the lever in one direction of cam rotation riding the cam rim and retaining the lever in outer position as it passes the opening to keep the valve open, and in the other direction of cam rotation extending into the opening to permit the valve to close.

References Cited in the file of this patent

UNITED STATES PATENTS

| 2,104,003 | Schieffer | Dec. 28, 1937 |
| 2,442,045 | Howse | May 25, 1948 |
| 2,662,241 | DeMart | Dec. 15, 1953 |